(12) United States Patent
Matias et al.

(10) Patent No.: US 9,967,457 B1
(45) Date of Patent: May 8, 2018

(54) SYSTEMS AND METHODS FOR DETERMINING PREFERENCES FOR CAPTURE SETTINGS OF AN IMAGE CAPTURING DEVICE

(71) Applicant: GOPRO, INC., San Mateo, CA (US)

(72) Inventors: Joven Matias, Cardiff, CA (US); Suejin Kim, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 94 days.

(21) Appl. No.: 15/004,842

(22) Filed: Jan. 22, 2016

(51) Int. Cl.
*H04N 5/228* (2006.01)
*H04N 5/232* (2006.01)
*G11B 27/10* (2006.01)

(52) U.S. Cl.
CPC ......... *H04N 5/23222* (2013.01); *G11B 27/10* (2013.01)

(58) Field of Classification Search
CPC ........... H04N 5/23222; H04N 5/23216; H04N 5/23203; G11B 27/10
USPC ............................................ 348/222.1–229.1
See application file for complete search history.

(56) References Cited

U.S. PATENT DOCUMENTS

| 89,987 | A | 1/1870 | Thobu |
|---|---|---|---|
| 563,528 | A | 7/1896 | Willson |
| 5,432,871 | A | 7/1995 | Novik |
| 6,384,862 | B1 | 5/2002 | Brusewitz |
| 6,434,265 | B1 | 8/2002 | Xiong |
| 6,486,908 | B1 | 11/2002 | Chen |
| 6,710,740 | B2 | 3/2004 | Needham |
| 6,711,293 | B1 | 3/2004 | Lowe |
| 6,788,333 | B1 | 9/2004 | Uyttendaele |
| 7,092,012 | B2 | 8/2006 | Nakamura |

(Continued)

FOREIGN PATENT DOCUMENTS

| EP | 0605045 A1 | 7/1994 |
|---|---|---|
| EP | 0650299 A1 | 4/1995 |
| EP | 0661672 A1 | 7/1995 |

OTHER PUBLICATIONS

U.S. Appl. No. 14/920,427, filed Oct. 22, 2015, entitled "Apparatus and Methods for Embedding Metadata Into Video Stream" 62 pages.

(Continued)

*Primary Examiner* — Yogesh Aggarwal
(74) *Attorney, Agent, or Firm* — Sheppard Mullin Richter & Hampton LLP

(57) ABSTRACT

Consumption information associated with a user consuming a first video segment may be obtained. The consumption information may define user engagement during a video segment and/or user response to the video segment. Consumption information associated with the user consuming a second video segment may be obtained. A first set of capture settings associated with capture of the first video segment may be obtained. A second set of capture settings associated with capture of the second video segment may be obtained. The preferences for the capture settings of the image capturing device may be determined based upon the first and second set of capture settings. Instructions may be transmitted to the image capturing device. The instructions may include the determined preferences for the capture settings and may be configured to cause the image capturing device to adjust the capture settings to the determined preferences.

20 Claims, 5 Drawing Sheets

(56) References Cited

U.S. PATENT DOCUMENTS

| | | | |
|---|---|---|---|
| 7,403,224 B2 | 7/2008 | Fuller | |
| 7,623,176 B2* | 11/2009 | Hoshino | G11B 27/11 348/231.3 |
| 7,983,502 B2 | 7/2011 | Cohen | |
| 8,044,992 B2 | 10/2011 | Kurebayashi | |
| 8,411,166 B2 | 4/2013 | Miyata | |
| 8,443,398 B2 | 5/2013 | Swenson | |
| 8,606,073 B2 | 12/2013 | Woodman | |
| 8,644,702 B1 | 2/2014 | Kalajan | |
| 8,670,030 B2 | 3/2014 | Tanaka | |
| 8,842,197 B2 | 9/2014 | Singh | |
| 8,890,954 B2 | 11/2014 | O'Donnell | |
| 8,896,694 B2 | 11/2014 | O'Donnell | |
| 9,001,217 B2 | 4/2015 | Kinoshita | |
| 9,019,396 B2 | 4/2015 | Kiyoshige | |
| 9,056,676 B1 | 6/2015 | Wang | |
| 9,106,872 B2 | 8/2015 | Tsurumi | |
| 9,342,534 B2 | 5/2016 | Singh | |
| 9,412,278 B1 | 8/2016 | Gong | |
| 9,473,758 B1 | 10/2016 | Long | |
| 9,602,795 B1 | 3/2017 | Matias | |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1 | 5/2003 | Arpa | |
| 2004/0021780 A1 | 2/2004 | Kogan | |
| 2004/0047606 A1 | 3/2004 | Mikawa | |
| 2004/0061667 A1 | 4/2004 | Sawano | |
| 2004/0075738 A1 | 4/2004 | Burke | |
| 2004/0135900 A1 | 7/2004 | Pyle | |
| 2004/0169724 A1 | 9/2004 | Ekpar | |
| 2004/0174434 A1 | 9/2004 | Walker | |
| 2004/0239763 A1 | 12/2004 | Notea | |
| 2005/0033760 A1 | 2/2005 | Fuller | |
| 2005/0062869 A1 | 3/2005 | Zimmermann | |
| 2005/0074185 A1 | 4/2005 | Jung | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2006/0195876 A1 | 8/2006 | Calisa | |
| 2007/0030358 A1 | 2/2007 | Aoyama | |
| 2007/0120986 A1 | 5/2007 | Nunomaki | |
| 2007/0140662 A1 | 6/2007 | Nunomaki | |
| 2007/0279494 A1 | 12/2007 | Aman | |
| 2008/0094499 A1 | 4/2008 | Ueno | |
| 2008/0118100 A1 | 5/2008 | Hayashi | |
| 2009/0118896 A1 | 5/2009 | Gustafsson | |
| 2009/0217343 A1 | 8/2009 | Bellwood | |
| 2009/0251558 A1 | 10/2009 | Park | |
| 2009/0262206 A1 | 10/2009 | Park | |
| 2010/0045773 A1 | 2/2010 | Ritchey | |
| 2010/0097443 A1 | 4/2010 | Lablans | |
| 2010/0228418 A1 | 9/2010 | Whitlow | |
| 2010/0238304 A1 | 9/2010 | Miyata | |
| 2010/0289924 A1 | 11/2010 | Koshikawa | |
| 2010/0299630 A1 | 11/2010 | McCutchen | |
| 2011/0102630 A1 | 5/2011 | Rukes | |
| 2011/0115883 A1 | 5/2011 | Kellerman | |
| 2011/0141300 A1 | 6/2011 | Stec | |
| 2011/0261227 A1 | 10/2011 | Higaki | |
| 2012/0098981 A1 | 4/2012 | Ip | |
| 2012/0143482 A1 | 6/2012 | Goossen | |
| 2012/0199689 A1 | 8/2012 | Burkland | |
| 2012/0199698 A1 | 8/2012 | Thomasson | |
| 2012/0206565 A1 | 8/2012 | Villmer | |
| 2012/0242798 A1 | 9/2012 | Mcardle | |
| 2013/0058619 A1 | 3/2013 | Miyakawa | |
| 2013/0127903 A1 | 5/2013 | Paris | |
| 2013/0132462 A1 | 5/2013 | Moorer | |
| 2013/0176403 A1 | 7/2013 | Varga | |
| 2013/0182177 A1 | 7/2013 | Furlan | |
| 2013/0210563 A1 | 8/2013 | Hollinger | |
| 2013/0235226 A1 | 9/2013 | Karn | |
| 2013/0314442 A1 | 11/2013 | Langlotz | |
| 2014/0037268 A1 | 2/2014 | Ryota Shoji | |
| 2014/0049652 A1 | 2/2014 | Moon | |
| 2014/0067162 A1 | 3/2014 | Paulsen | |
| 2014/0211987 A1 | 7/2014 | Fan | |
| 2014/0240122 A1 | 8/2014 | Roberts | |
| 2014/0267544 A1 | 9/2014 | Li | |
| 2014/0270480 A1 | 9/2014 | Boardman | |
| 2015/0055937 A1 | 2/2015 | Van Hoff | |
| 2015/0058102 A1 | 2/2015 | Christensen | |
| 2015/0134673 A1* | 5/2015 | Golan | G06F 17/30843 707/748 |
| 2015/0186073 A1 | 7/2015 | Pacurariu | |
| 2015/0189221 A1 | 7/2015 | Nakase | |
| 2015/0287435 A1 | 10/2015 | Land | |
| 2015/0296134 A1 | 10/2015 | Cudak | |
| 2015/0341550 A1 | 11/2015 | Lay | |
| 2015/0346722 A1 | 12/2015 | Herz | |
| 2015/0362917 A1 | 12/2015 | Wang | |
| 2016/0005435 A1 | 1/2016 | Campbell | |
| 2016/0048966 A1 | 2/2016 | Kuehnle | |
| 2016/0055883 A1 | 2/2016 | Soll | |
| 2016/0104284 A1 | 4/2016 | Maguire | |
| 2016/0112713 A1 | 4/2016 | Russell | |
| 2016/0117829 A1 | 4/2016 | Yoon | |
| 2016/0180197 A1 | 6/2016 | Kim | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0274582 A1 | 9/2016 | Banda | |
| 2016/0308813 A1 | 10/2016 | Kalajan | |
| 2016/0313732 A1 | 10/2016 | Seydoux | |
| 2016/0313734 A1 | 10/2016 | Enke | |
| 2016/0366290 A1 | 12/2016 | Hoshino | |
| 2017/0015405 A1 | 1/2017 | Chau | |
| 2017/0023939 A1 | 1/2017 | Krouse | |

OTHER PUBLICATIONS

U.S. Appl. No. 14/927,343, filed Oct. 29, 2015, entitled "Apparatus and Methods for Rolling Shutter Compensation for Multi-Camera Systems" 45 pages.

U.S. Appl. No. 14/949,786, filed Nov. 23, 2015, entitled "Apparatus and Methods for Image Alignment" 67 pages.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Farin et al., "Shortest Circular Paths on Planar Graphs," In 27th Symposium on Information Theory in the Benelux 2006, 8 pgs.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul. 30, 2000), pp. 1419-1422, XP010512772, DOI: 10.1109/ICME. 2000.871033 ISBN: 978-0-7803-6536-0.

Hossein Afshari et al: "The PANOPTIC Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301. 1599394.

Mai Zheng et al: "Stitching Video from Webcams", Dec. 1 2008 (Dec. 1, 2008), Advances in Visual Computing: 4th International Symposium, ISVC 2008, Las Vegas, NV, USA, Dec. 1-3, 2008.

(56) References Cited

OTHER PUBLICATIONS

Proceedings, Part II, Springer Berlin Heidelberg, Berlin, Heidelberg, pp. 420-429, XP019112243, ISBN: 978-3-540-89645-6 le document en entier.
PCT International Search Report for PCT/EP2014/057352 dated Jun. 27, 2014, 3 pages.
PCT International Search Report for PCT/EP2014/058008 dated May 26, 2014, 3 pages.
PCT International Search Report for PCT/EP2014/061897 dated Sep. 15, 2014, 3 pages.
Perazzi et al., "Panoramic Video from Unstructured Camera Arrays," Eurographics, vol. 34 (2015), No. 2, 12pgs.
Ryan Jackson: 'Shooting 360-degree video with four GoPro HD Hero cameras / Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.
Zhi et al., "Toward Dynamic Image Mosaic Generation With Robustness to Parallax," IEEE Transactions on Image Processing, vol. 21, No. 1, Jan. 2012, pp. 366-378.
U.S. Appl. No. 15/001,038, filed Jan. 19, 2016, entitled "Metadata Capture Apparatus and Methods" 54 pages.

\* cited by examiner

SYSTEMS AND METHODS FOR DETERMINING PREFERENCES FOR CAPTURE SETTINGS OF AN IMAGE CAPTURING DEVICE

FIELD

The disclosure relates to systems and methods for determining preferences for capture settings of an image capturing device based on content consumed by a user.

BACKGROUND

Image capturing devices are used to capture images and/or videos of its surroundings. They may be used to capture special moments, sporting events, concerts, etc. Image capturing devices may be preconfigured with particular capture settings. The preconfigured capture settings may not be individualized for each user of the device. Configuration may take place through manual manipulation by the user. Adjustment of capture settings may impact the tone, hue, exposure level, sharpness, depth of field, frame rate, resolution, color depth, and/or other aspects of images and/or videos.

SUMMARY

The disclosure relates to determining preferences for capture settings of an image capturing device based upon user consumption of previously captured content, in accordance with one or more implementations. Consumption information associated with a user consuming a first video segment and a second video segment may be obtained. The consumption information may define user engagement during a video segment and/or user response to the video segment. A first set of capture settings associated with capture of the first video segment and a second set of capture settings associated with capture of the second set of capture settings may be obtained. Based upon a determination relative user interest in the first video segment and the second video segment (e.g., the user may view the first video segment more frequently than the second video segment, the user may share portions of the first video segment more than portions of the second video segment, etc.), preferences for the capture settings of the image capturing device may be determined based upon the first set of capture settings and/or the second set of capture settings. Instructions may be transmitted to the image capturing device including the determined preferences for the capture settings. The instructions may be configured to cause the image capturing device to adjust the capture settings to the determined preferences.

In some implementations, a system configured to determine preferences for capture settings of an image capturing device based upon user consumption of previously captured content may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an authentication component, a consumption component, a capture settings component, a preferences component, a transmission component, and/or other components.

The authentication component may be configured to authenticate a user associated with one or more client computing platforms accessing one or more images and/or video segments via the system. The authentication component may manage accounts associated with users and/or consumers of the system. The user accounts may include user information associated with users and/or consumers of the user accounts. User information may include information stored by the server(s), one or more client computing platforms, and/or other storage locations.

The consumption component may be configured to obtain consumption information associated with a user consuming a first video segment and a second video segment. The first video segment and the second video segment may be available for consumption within the repository of video segments available via the system and/or available on a third party platform, which may be accessible and/or available via the system. The consumption information may define user engagement during a video segment and/or user response to the video segment. User engagement during the video segment may include at least one of an amount of time the user consumed the video segment and a number of times the user consumes at least one portion of the video segment. The consumption component may track user engagement and/or viewing habits during the video segment and/or during at least one portion of the video segment. User response to the video segment may include one or more of commenting on the video segment, rating the video segment, up-voting (e.g., "liking") the video segment, and/or sharing the video segment, consumption information may be stored by the server(s), the client computing platforms, and/or other storage locations. The consumption component may be configured to determine a consumption score associated with the consumption information associated with the user consuming the video segment. The consumption score may quantify a degree of interest of the user consuming the video segment and/or the at least one portion of the video segment.

The capture settings component may be configured to obtain a first set of capture settings associated with capture of the first video segment consumed by the user and a second set of capture settings associated with capture of the second video segment consumed by the user. Capture settings may define aspects of operation for one or more of a processor of the image capturing device that captured the video segment, an imaging sensor of the image capturing device that captured the video segment, and/or an optical element of the first capturing device that captured the video segment. Capture settings of the image capturing device may include one or more of a shutter speed, a resolution, a frame rate, white balance, an exposure, a field of view, an aperture, focus modes, and/or other capture settings.

The preferences component may be configured to determine the preferences for the capture settings of the image capturing device based upon the first set of capture settings and the second set of capture settings. The preferences for the capture settings may be associated with the user who consumed the first video segment and the second video segment. The preferences for the capture settings may be determined based upon the consumption score associated with the first video segment and/or the consumption score associated with the second video segment. For example, the preferences for the capture settings for the image capturing device may be determined based upon the obtained first set of capture settings associated with the first video segment, such that the preferences for the capture settings may be determined to be the same as the first set of capture settings. The preferences for the capture settings for the image capturing device may be determined based upon the obtained second set of capture settings associated with the second video segment, such that the preferences for the capture settings may be determined to be the same as the second set of capture settings. The preferences for the capture settings for the image capturing device may be a combination of the first set of capture settings and the second set of capture settings. The combination may be based upon commonalities between the first set of capture settings and the second set of capture settings, such that the preferences for the capture settings for the image capturing device may be determined to be the common capture settings between the first set of capture settings and the second set of capture settings.

The transmission component may be configured to effectuate transmission of instructions to the image capturing device. The instructions may include the determined preferences for the capture settings. The instructions may be configured to cause the image capturing device to adjust the capture settings of the image capturing device to the determined preferences. The instructions may be configured to cause the image capturing device to automatically adjust the capture settings of the image capturing device to the determined preferences the next time the image capturing device is activated (e.g., turned on, in use, and/or capturing an image and/or video segment) or each time the image capturing device is activated. The image capturing device may adjust the capture settings prior to capturing an image and/or video segment. The instructions may be configured to cause the image capturing device to automatically adjust the capture settings of the image capturing device to the determined preferences based upon current contextual information associated with the image capturing device and current capture settings of the image capturing device. Contextual information associated with capture of video segments may define one or more temporal attributes and/or spatial attributes associated with capture the video segments. Contextual information may include any information pertaining to an environment in which the video segment was captured. Contextual information may include visual and/or audio information based upon the environment in which the video segment was captured. Temporal attributes may define a time in which the video segment was captured (e.g., date, time, time of year, season, etc.). Spatial attributes may define the environment in which the video segment was captured (e.g., location, landscape, weather, surrounding activities, etc.). The one or more temporal attributes and/or spatial attributes may include one or more of a geolocation attribute, a time attribute, a date attribute, and/or a content attribute.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
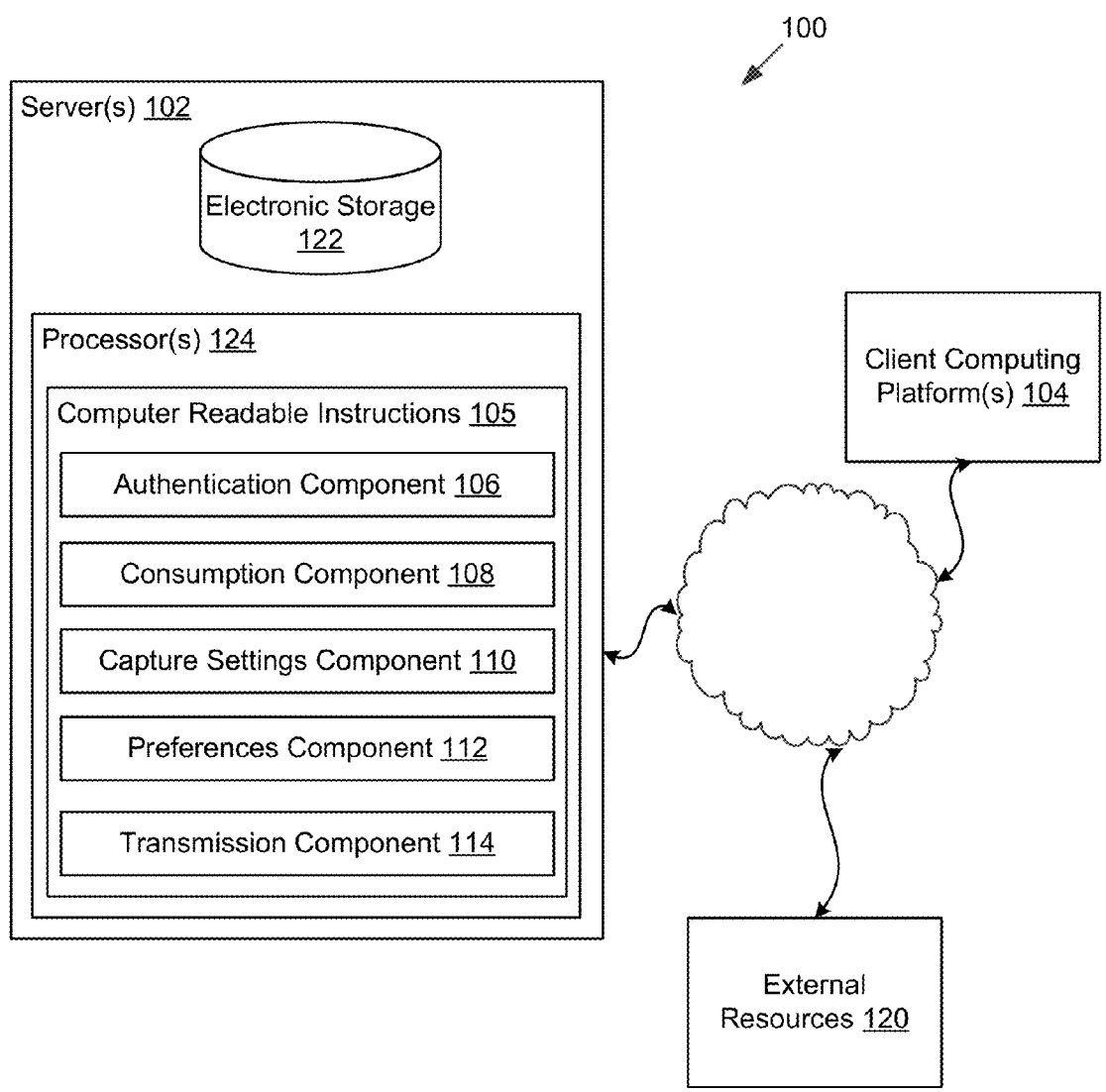
FIG. 1 illustrates a system for determining preferences for capture settings of an image capturing device, in accordance with one or more implementations.

FIG. 1 illustrates a system 100 for determining preferences for capture settings of an image capturing device based upon user consumption of previously captured content, in accordance with one or more implementations. As is illustrated in FIG. 1, system 100 may include one or more servers 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of authentication component 106, consumption component 108, capture settings component 110, preferences component 112, transmission component 114, and/or other components.

A repository of images and/or video segments may be available via system 100. The repository of images and/or video segments may be associated with different users. The video segments may include a compilation of videos, video segments, video clips, and/or still images. While the present disclosure may be directed to video and/or video segments, one or more other implementations of system 100 and/or server(s) 102 may be configured for other types of media items. Other types of media items may include one or more of audio files (e.g., music, podcasts, audio books, and/or other audio files), multimedia presentations, photos, slideshows, and/or other media files. The video segments may be received from one or more storage locations associated with client computing platform(s) 104, server(s) 102, and/or other storage locations where video segments may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms.

Authentication component 106 may be configured to authenticate a user associated with client computing platform 104 accessing one or more images and/or video segments via system 100. Authentication component 106 may manage accounts associated with users and/or consumers of system 100. The user accounts may include user information associated with users and/or consumers of the user accounts. User information may include information stored by server(s) 102, one or more client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 106 may be configured to obtain user information via one or more client computing platform(s) 104 (e.g., user input via a user interface, etc.). If a user and/or consumer does not have a preexisting user account associated with system 100, a user and/or consumer may register to receive services provided by server 102 via a website, web-based application, mobile application, and/or user application. Authentication component 106 may be configured to create a user ID and/or other identifying information for a user and/or consumer when the user and/or consumer registers. The user ID and/or other identifying information may be associated with one or more client computing platforms 104 used by the user and/or consumer. Authentication component 106 may be configured to store such association with the user account of the user and/or consumer. A user and/or consumer may associate one or more accounts associated with social network services, messaging services, and the like with an account provided by system 100.

Consumption component 108 may be configured to obtain consumption information associated with a user consuming a first video segment. Consumption component 108 may be configured to obtain consumption information associated with the user consuming a second video segment. The first video segment and the second video segment may be available for consumption within the repository of video segments available via system 100 and/or available on a third party platform, which may be accessible and/or available via system 100.

The consumption information may define user engagement during a video segment and/or user response to the video segment. User engagement during the video segment may include at least one of an amount of time the user consumed the video segment and a number of times the user consumes at least one portion of the video segment. Consumption component 108 may track user engagement and/or viewing habits during the video segment and/or during at least one portion of the video segment. Viewing habits during consumption of the video segment may include an amount of time the user views the video segment and/or at least one portion of the video segment, a number of times the user views the video segment and/or the at least one portion of the video segment, a number of times the user views other video segments related to the first video segment and/or video segments related to the at least one portion of the video segment, and/or other user viewing habits. User response to the video segment may include one or more of commenting on the video segment, rating the video segment, up-voting (e.g., "liking") the video segment, and/or sharing the video segment. Consumption information may be stored by server(s) 102, client computing platforms 104, and/or other storage locations.

Consumption component 108 may be configured to determine a consumption score associated with the consumption information associated with the user consuming the video segment. The consumption score may quantify a degree of interest of the user consuming the video segment and/or the at least one portion of the video segment. Consumption component 108 may determine the consumption score based upon the user engagement during the video segment, the user response to the video segment, and/or other factors. Consumption scores may be a sliding scale of numerical values (e.g., 1, 2, . . . n, where a number may be assigned as low and/or high), verbal levels (e.g., very low, low, medium, high, very high, and/or other verbal levels), and/or any other scheme to represent a consumption score. Individual video segments may have one or more consumption scores associated with it. For example, different portions of the individual video segments may be associated with individual consumption scores. An aggregate consumption score for a video segment may represent a degree of interest of the user consuming the video segment based upon an aggregate of consumption scores associated with the individual portions of the video segment. Consumption scores may be stored by server(s) 102, client computing platforms 104, and/or other storage locations.

Figure 2:
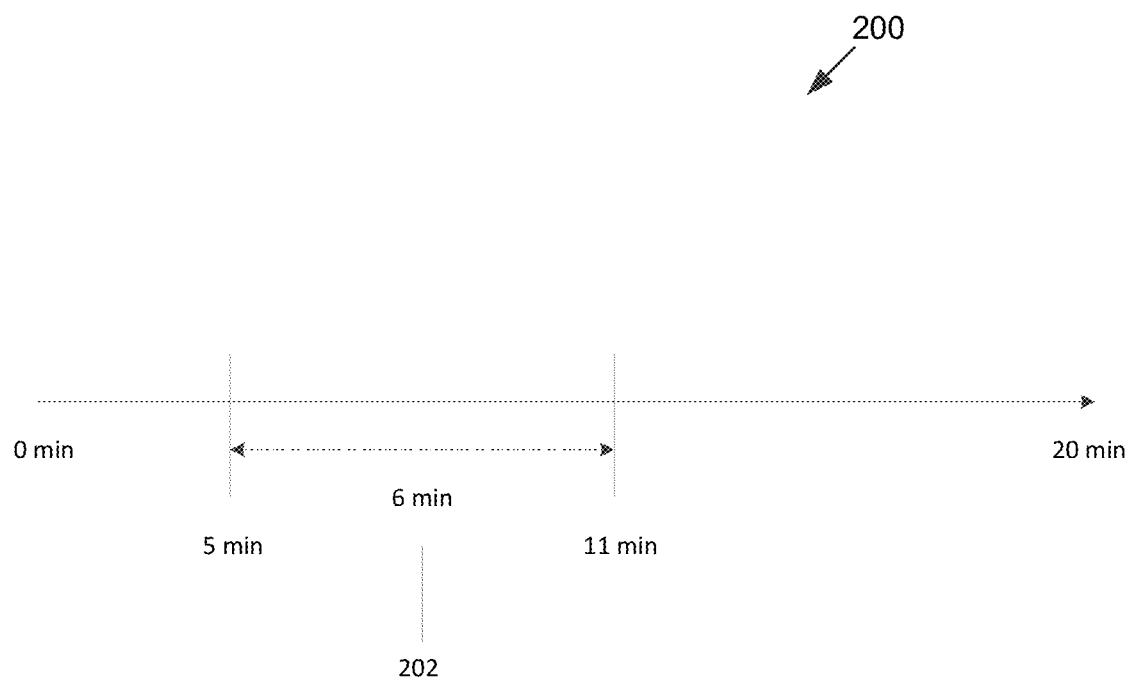
FIG. 2 illustrates an exemplary timeline of a video segment, in accordance with one or more implementations.

For example and referring to FIG. 2, first video segment 200 including at least one portion 202 may be included within the repository of video segments available via system 100. While first video segment 200 is shown to be over 20 minutes long, this is for exemplary purposes only and is not meant to be a limitation of this disclosure, as video segments may be any length of time. If the user frequently consumes and/or views first video segment 200 and/or at least one portion 202 of first video segment 200, consumption component 108 from FIG. 1 may associate first video segment 200 and/or at least one portion 202 of first video segment 200 with a consumption score representing a higher degree of interest of the user than other video segments that the user did not consume as frequently as first video segment 200. If the user consumes the 6 minutes of at least one portion 202 of first video segment 200 more often than other portions of first video segment 200, consumption component 108 from FIG. 1 may associate at least one portion 202 of first video segment 200 with a consumption score representing a higher degree of interest of the user than other portions of first video segment 200 that the user did not consume as frequently as at least one portion 202. In another example, if the user comments on the second video segment (not shown), rates the second video segment, shares the second video segment and/or at least one portion of the second video segment, and/or endorses the second video segment in other ways, consumption component 108 may associate the second video segment and/or the at least one portion of the second video segment with a consumption score representing a higher degree of interest of the user than other video segments that the user did not comment on, rate, share, up-vote, and/or endorse in other ways.

Referring back to FIG. 1, capture settings component 108 may be configured to obtain a first set of capture settings associated with capture of the first video segment consumed by the user. Capture settings component 108 may be configured to obtain a second set of capture settings associated with capture of the second video segment consumed by the user. Capture settings may define aspects of operation for one or more of a processor of the image capturing device that captured the video segment, an imaging sensor of the image capturing device that captured the video segment, and/or an optical element of the first capturing device that captured the video segment.

Capture settings of the image capturing device may include one or more of a shutter speed, a resolution, a frame rate, white balance, an exposure, a field of view, an aperture, focus modes, and/or other capture settings. Capture settings of the image capturing device may be based upon a position of the image capturing device (including a position of a first image capturing device within a group of image capturing devices with respect to positions of the other image capturing devices within the group of image capturing devices and/or a mounting position of the image capturing device) and/or a perspective of the image capturing device.

In some implementations, capture settings may correspond to one or more cinematic settings of a video segment. Cinematic settings may correspond to one or more cinematography effects set by a user and/or the image capturing device when the video segment was captured. For example, cinematic settings may include one or more of a camera perspective, camera mounting position, shot framing, shot filter, lighting arrangement, a shot transition, a frame rate, a resolution, shutter speed, and/or other cinematic settings that may be determined from the video segment.

Capture settings may be determined based upon one or more of feature point and/or object detection techniques, output from one or more sensors of the image capturing device that captured the video segment, predetermined settings of the image capturing device that captured the video segment, settings preconfigured by a user prior to, during, and/or after capture, and/or other techniques. For example, settings of the image capturing device that captured the video segment may include one or more of a frame rate, resolution, shutter speed, field of view, time lapse interval, low light mode, photo mode, white balance, color, ISO, sharpness, exposure, and/or other settings. Feature point and/or object detection techniques may determine one or more of a camera perspective, camera mounting position, shot framing, and/or other information.

Capture settings component 110 may determine capture settings of the image capturing device that captured the individual video segments directly from the video segment, via metadata associated with the video segment and/or portions of the video segment, and/or via tags associated with the video segment and/or portions of the video segment. At the time when the video segment was captured and/or stored, capture settings of the image capturing device capturing the video segment may have been recorded and/or stored in memory and associated with the video segment and/or portions of the video segment. Capture settings may vary throughout a given video segment, as different portions of the video segment at different points in time of the video segment may be associated with different capture settings of the image capturing device. Capture settings component 110 may determine the first set of capture settings associated with capture of the first video segment directly from the first video segment. Capture settings component 110 may obtain the first set of capture settings associated with capture of the first video segment via metadata and/or tags associated with the first video segment and/or portions of the first video segment. Capture settings component 110 may determine the second set of capture settings associated with capture of the second video segment directly from the second video segment. Capture settings component 110 may obtain the second set of capture settings associated with capture of the second video segment via metadata and/or tags associated with the second video segment and/or portions of the second video segment.

Preferences component 112 may be configured to determine the preferences for the capture settings of the image capturing device based upon the first set of capture settings and the second set of capture settings. The preferences for the capture settings may be associated with the user who consumed the first video segment and the second video segment. The preferences for the capture settings may be determined based upon the consumption score associated with the first video segment and/or the consumption score associated with the second video segment. For example, the preferences for the capture settings for the image capturing device may be determined based upon the obtained first set of capture settings associated with the first video segment, such that the preferences for the capture settings may be determined to be the same as the first set of capture settings. The preferences for the capture settings for the image capturing device may be determined based upon the obtained second set of capture settings associated with the second video segment, such that the preferences for the capture settings may be determined to be the same as the second set of capture settings. The preferences for the capture settings for the image capturing device may be a combination of the first set of capture settings and the second set of capture settings. The combination may be based upon commonalities between the first set of capture settings and the second set of capture settings, such that the preferences for the capture settings for the image capturing device may be determined to be the common capture settings between the first set of capture settings and the second set of capture settings.

The preferences for the capture settings may be based upon individual video segments and/or portions of video segments that may be associated with consumption scores representing a higher degree of interest of the user than other video segments and/or portions of video segments. Preferences component 112 may determine commonalities between individual video segments and/or portions of video segments with consumption scores representing a higher degree of interest of the user (e.g., the first video segment and the second video segment). Commonalities between the video segments and/or portions of video segments with consumption scores representing a higher degree of interest of the user may include common capture settings between the video segments and/or portions of video segments with consumption scores representing a higher degree of interest of the user. For example, if the first video segment and the second video segment are associated with consumption scores representing a higher degree of interest of the user, preferences component 112 may determine common capture settings between the first video segment (e.g., the first set of capture settings) and the second video segment (e.g., the second set of capture settings) and/or portions of the first video segment and portions of the second video segment. Preferences component 112 may determine the preferences for the capture settings for the image capturing device to be the common capture settings between the first set of capture settings and the second set of capture settings.

Commonalities between the video segments and/or portions of video segments with consumption scores representing a higher degree of interest of the user may include common contextual information associated with capture of the video segments and/or portions of video segments with consumption scores representing a higher degree of interest of the user. Contextual information associated with capture of the video segments and/or portions of video segments may define one or more temporal attributes and/or spatial attributes associated with capture of the video segments and/or portions of video segments. Contextual information may include any information pertaining to an environment in which the video segment was captured. Contextual information may include visual and/or audio information based upon the environment in which the video segment was captured. Temporal attributes may define a time in which the video segment was captured (e.g., date, time, time of year, season, etc.). Spatial attributes may define the environment in which the video segment was captured (e.g., location, landscape, weather, surrounding activities, etc.). The one or more temporal attributes and/or spatial attributes may include one or more of a geolocation attribute, a time attribute, a date attribute, and/or a content attribute. System 100 may obtain contextual information associated with capture of the video segments directly from the video segments, via metadata associated with the video segments and/or portions of the video segments, and/or tags associated with the video segments and/or portions of the video segments. For example, different portions of the video segments may include different tags and/or may be associated with different metadata including contextual information and/or capture setting information.

A geolocation attribute may include a physical location of where the video segment was captured. The geolocation attribute may correspond to one or more of a compass heading, one or more physical locations of where the video segment was captured, a pressure at the one or more physical locations, a depth at the one or more physical locations, a temperature at the one or more physical locations, and/or other information. Examples of the geolocation attribute may include the name of a country, region, city, a zip code, a longitude and/or latitude, and/or other information relating to a physical location where the video segment and/or portion of the video segment was captured.

A time attribute may correspond to a one or more timestamps associated with when the video segment was captured. Examples of the time attribute may include a time local to the physical location (which may be based upon the geolocation attribute) of when the video segment was captured, the time zone associated with the physical location, and/or other information relating to a time when the video segment and/or portion of the video segment was captured.

A date attribute may correspond to a one or more of a date associated with when the video segment was captured, seasonal information associated with when the video segment was captured, and/or a time of year associated with when the video segment was captured.

A content attribute may correspond to one or more of an action depicted within the video segment, one or more objects depicted within the video segment, and/or a landscape depicted within the video segment. For example, the content attribute may include a particular action (e.g., running), object (e.g., a building), and/or landscape (e.g., beach) portrayed and/or depicted in the video segment. One or more of an action depicted within the video segment may include one or more of sport related actions, inactions, motions of an object, and/or other actions. One or more of an object depicted within the video segment may include one or more of a static object (e.g., a building), a moving object (e.g., a moving train), a particular actor (e.g., a body), a particular face, and/or other objects. A landscape depicted within the video segment may include scenery such as a desert, a beach, a concert venue, a sports arena, etc. Content of the video segment may be determined based upon object detection of content included within the video segment.

Preferences component 112 may determine and/or obtain contextual information associated with capture of the first video segment and/or the second video segment. Based upon commonalities between the contextual information associated with capture of the first video segment and the second video segment, preferences component 112 may determine the preferences for the capture settings of the image capturing device to be common capture settings between the first set of capture settings and the second set of capture settings where contextual information associated with capture of the first video segment is similar to contextual information associated with capture of the second video segment. Preferences component 112 may consider the consumption score associated with the individual video segments when determining commonalities between contextual information associated with capture of the individual video segments.

Transmission component 114 may be configured to effectuate transmission of instructions to the image capturing device. The instructions may include the determined preferences for the capture settings. The instructions may be configured to cause the image capturing device to adjust the capture settings of the image capturing device to the determined preferences. The instructions may be configured to cause the image capturing device to automatically adjust the capture settings of the image capturing device to the determined preferences the next time the image capturing device is activated (e.g., turned on, in use, and/or capturing an image and/or video segment) or each time the image capturing device is activated. The image capturing device may adjust the capture settings prior to capturing an image and/or video segment.

The instructions may be configured to cause the image capturing device to automatically adjust the capture settings of the image capturing device to the determined preferences based upon current contextual information associated with the image capturing device and current capture settings of the image capturing device. The current contextual information may define current temporal attributes and/or current spatial attributes associated with the image capturing device. The current contextual information, current temporal attributes, and/or current spatial attributes may be similar to the contextual information, temporal attributes, and/or spatial attributes discussed above. System 100 and/or the image capturing device may determine and/or obtain current temporal attributes and/or current spatial attributes in real-time. Contextual information may include any information pertaining to an environment in which the image capturing device is in and/or surrounded by. Contextual information may be obtained via one or more sensors internal and/or external to the image capturing device. The contextual information may be transmitted to system 100 via image capturing device and/or directly from one or more sensors external to the image capturing device.

The geolocation attribute may be determined based upon one or more of geo-stamping, geotagging, user entry and/or selection, output from one or more sensors (external to and/or internal to the image capturing device), and/or other techniques. For example, the image capturing device may include one or more components and/or sensors configured to provide one or more of a geo-stamp of a geolocation of a current video segment prior to, during, and/or post capture of the current video segment, output related to ambient pressure, output related to depth, output related to compass headings, output related to ambient temperature, and/or other information. For example, a GPS of the image capturing device may automatically geo-stamp a geolocation of where the current video segment is captured (e.g., Del Mar, Calif.). The user may provide geolocation attributes based on user entry and/or selection of geolocations prior to, during, and/or post capture of the current video segment.

The time attribute may be determined based upon timestamping and/or other techniques. For example, the image capturing device may include an internal clock that may be configured to timestamp the current video segment prior to, during, and/or post capture of the current video segment (e.g., the image capturing device may timestamp the current video segment at 1 PM PST). In some implementations, the user may provide the time attribute based upon user entry and/or selection of timestamps prior to, during, and/or post capture of the current video segment.

The date attribute may be determined based upon date stamping and/or other techniques. For example, the image capturing device may include an internal clock and/or calendar that may be configured to date stamp the current video segment prior to, during, and/or post capture of the current video segment. In some implementations, the user may provide the date attribute based upon user entry and/or selection of date stamps prior to, during, and/or post capture of the current video segment. Seasonal information may be based upon the geolocation attribute (e.g., different hemispheres experience different seasons based upon the time of year).

The content attribute may be determined based upon one or more action, object, landscape, and/or composition detection techniques. Such techniques may include one or more of SURF, SIFT, bounding box parameterization, facial recognition, visual interest analysis, composition analysis (e.g., corresponding to photography standards such as rule of thirds and/or other photography standards), audio segmentation, visual similarity, scene change, motion tracking, and/or other techniques. In some implementations content detection may facilitate determining one or more of actions, objects, landscapes, composition, and/or other information depicted in the current video segment. Composition may correspond to information determined from composition analysis and/or other techniques. For example, information determined from composition analysis may convey occurrences of photography standards such as the rule of thirds, and/or other photograph standards. In another example, a sport related action may include surfing. The action of surfing may be detected based upon one or more objects that convey the act of surfing. Object detections that may convey the action of surfing may include one or more of a wave shaped object, a human shaped object standing on a surfboard shaped object, and/or other objects.

Upon determination of current contextual information associated with the image capturing device, the image capturing device may be configured to adjust the current capture settings to the determined preferences based upon the current contextual information and current capture settings of the image capturing device. The current capture settings may be the preferences for the capture settings included within the instructions. The current capture settings may be the last set of capture settings configured the last time the image capturing device was in use. The current capture settings may be pre-configured by the image capturing device.

Current contextual information may be transmitted to system 100 such that system 100 may determine preferences for capture settings of the image capturing device in real-time or near real-time based upon user preferences of capture settings relating to consumption scores associated with the first video segment (e.g., the first set of capture settings) and the second video segment (e.g., the second set of capture settings). The current contextual information may be transmitted to system 100 prior to, during, and/or post capture of the current video segment. Transmission component 114 may be configured to effectuate transmission of instructions to the image capturing device in real-time or near real-time in response to receiving the current contextual information associated with capture of the current video segment.

For example, system 100 may determine that the user has a preference for video segments including surfing. If a majority of the video segments that kept the user engaged included surfing and were captured with similar capture settings, and if system 100 receives current contextual information indicating that the user is currently capturing a video segment including surfing, then transmission component 114 may effectuate transmission of instructions to the image capturing device, in real-time or near real-time, to automatically adjust the capture settings of the image capturing device to the capture settings of the video segments consumed by the user which included surfing. Transmission component 114 may be configured to effectuate transmission of the instructions to the image capturing device prior to and/or during capture of the current video segment. The capture settings of the image capturing device may be adjusted prior to and/or during capture of the current video segment. The current capture settings of image capturing device which are different from the determined preferences included within the instructions may be adjusted to the determined preferences included within the instructions.

This process may be continuous such that system 100 may transmit instructions to image capturing device based upon current contextual information associated with capture of a current video segment, current capture settings, and/or capture settings associated with previously stored and/or consumed video segments and/or portions of video segments which the user has a preference for. The preferences may be determined based upon contextual information associated with capture of the preferred video segments and/or portions of video segments.

Figure 3:
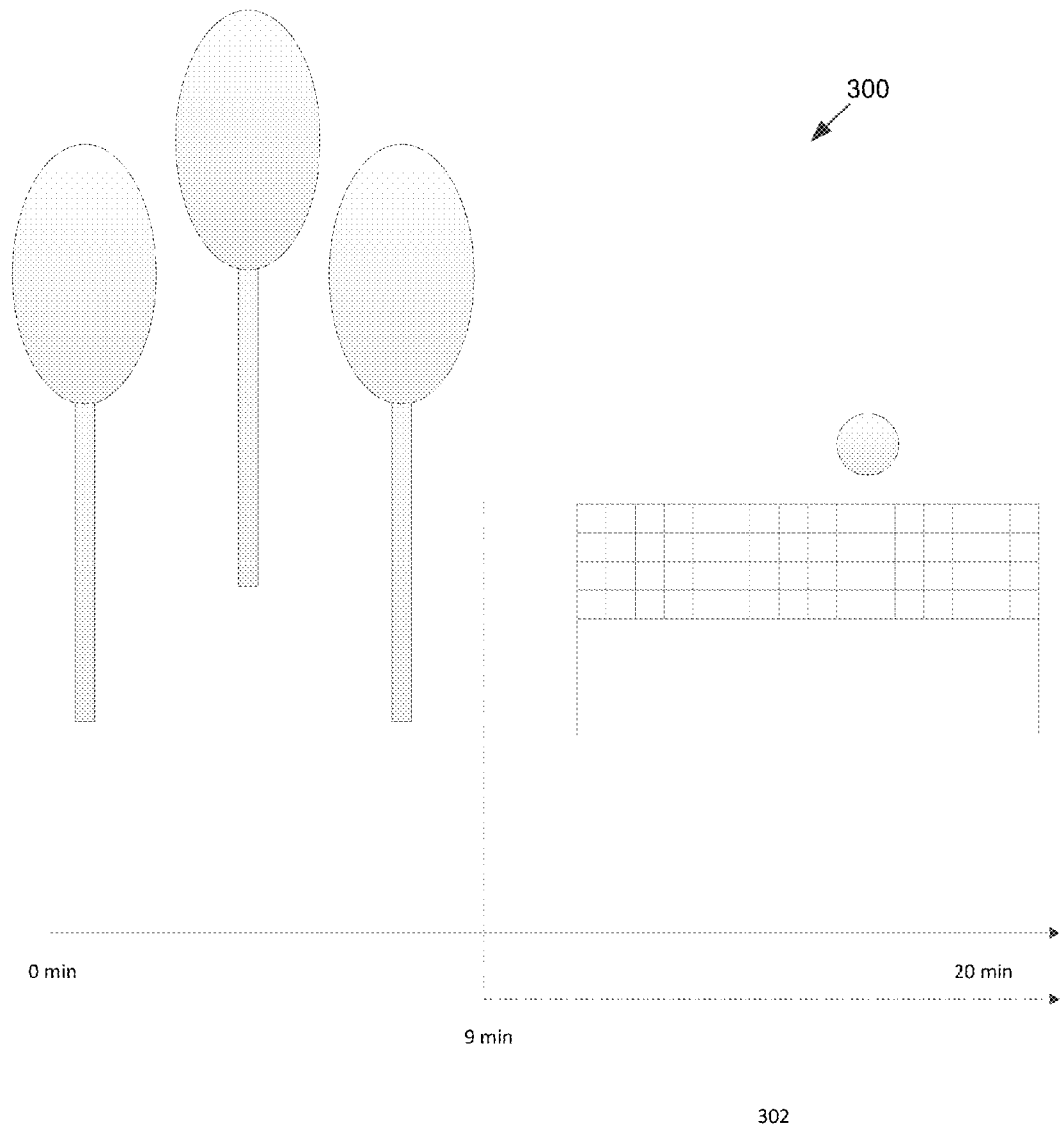
FIG. 3 illustrates content depicted within a video segment, in accordance with one or more implementations.

Referring to FIG. 3, video segment 300 is shown. The user may have consumed portion 302 of video segment 300 more frequently and/or shared portion 302 of video segment 300 more times than other portions of video segment 300 (e.g., portion 302 of video segment 300 may be associated with a consumption score representing a higher degree of interest of the user than other portions of video segment 300). System 100 may determine and/or obtain contextual information relating to capture of portion 302 includes that at least portion 302 of video segment 300 was captured in a park in San Diego and that a game of volleyball is depicted within portion 302 of video segment 300. Other portions of video segment 300 may simply depict the park. System 100, via capture settings component 110 of FIG. 1, may obtain a set of capture settings associated with capture of portion 302 of video segment 300 and/or other portions of video segment 300 in a similar manner as described above. System 100, via preferences component 112 of FIG. 1, may determine the preferences for the capture settings of the image capturing device associated with the user based upon the obtained set of capture settings associated with capture of portion 302 and/or other portions of video segment 300 in a similar manner as described above. System 100, via transmission component 114 of FIG. 1, may effectuate transmission of the preferences for the capture settings to the image capturing device associated with the user.

Figure 4:
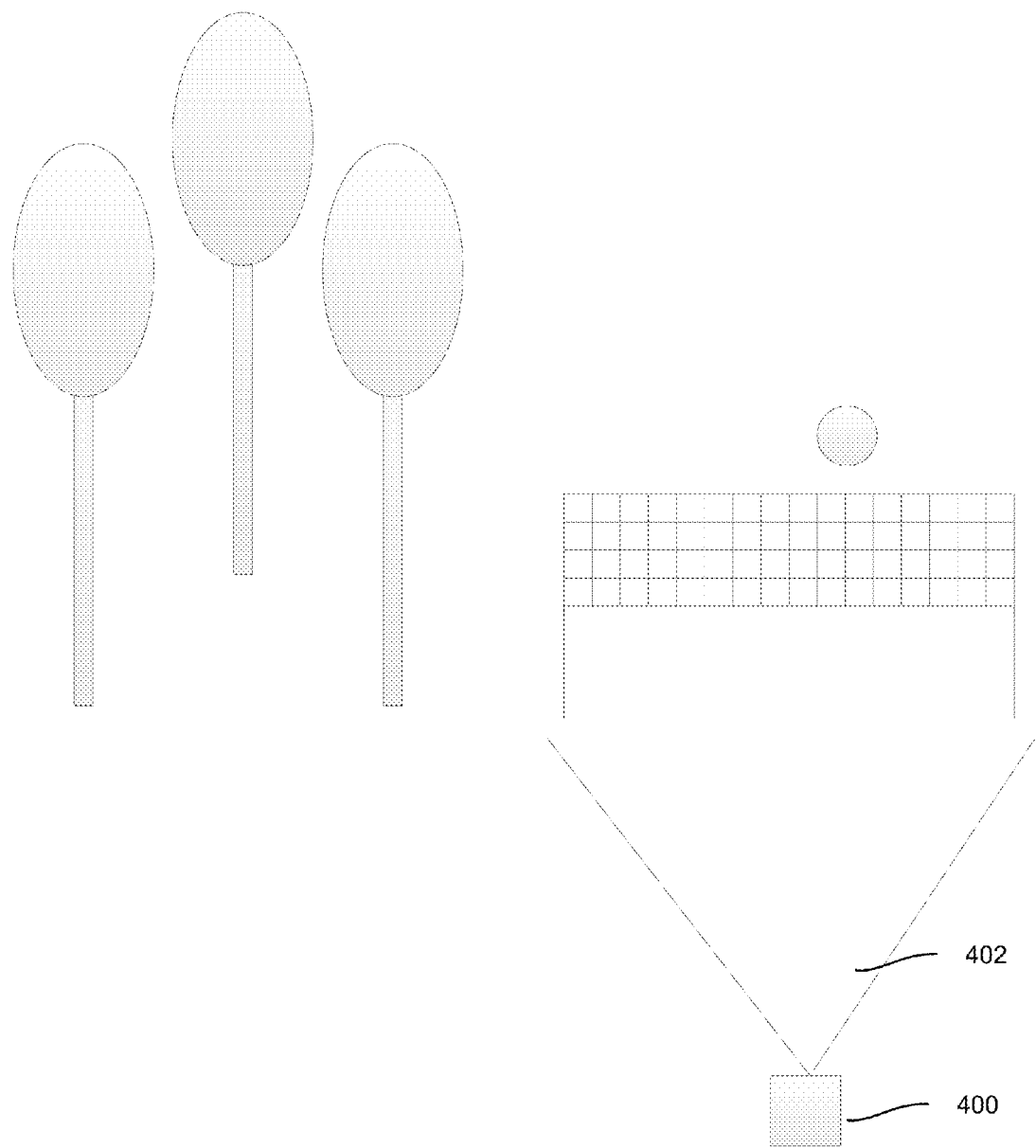
FIG. 4 illustrates a field of view of an image capturing device, in accordance with one or more implementations.

Referring to FIG. 4, image capturing device 400 is depicted. Image capturing device 400 may be located in a similar park as the park depicted in video segment 300 of FIG. 3. Image capturing device 400 may begin capturing a video of the park with current capture settings. The current capture settings of image capturing device 400 may include the last set of capture settings when image capturing device 400 was last in use, pre-configured capture settings by image capturing device 400, manual configuration by the user, adjusted capture settings based upon received instructions including preferences for the current capture settings from system 100 (e.g., the received instructions may have been in response to image capturing device 400 being located in a park with trees in field of view 402 of image capturing device 400), and/or other current settings of image capturing device 400. Upon a volleyball game entering field of view 402 of image capturing device 400, image capturing device 400 may be configured to automatically adjust the current capture settings to a set of preferred capture settings based upon instructions transmitted from system 100 while continuing to capture the video segment without interruption. The set of preferred capture settings included within the instructions may include the determined preferences for the capture settings based upon user engagement of portion 302 of video segment 300 of FIG. 3.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 5:
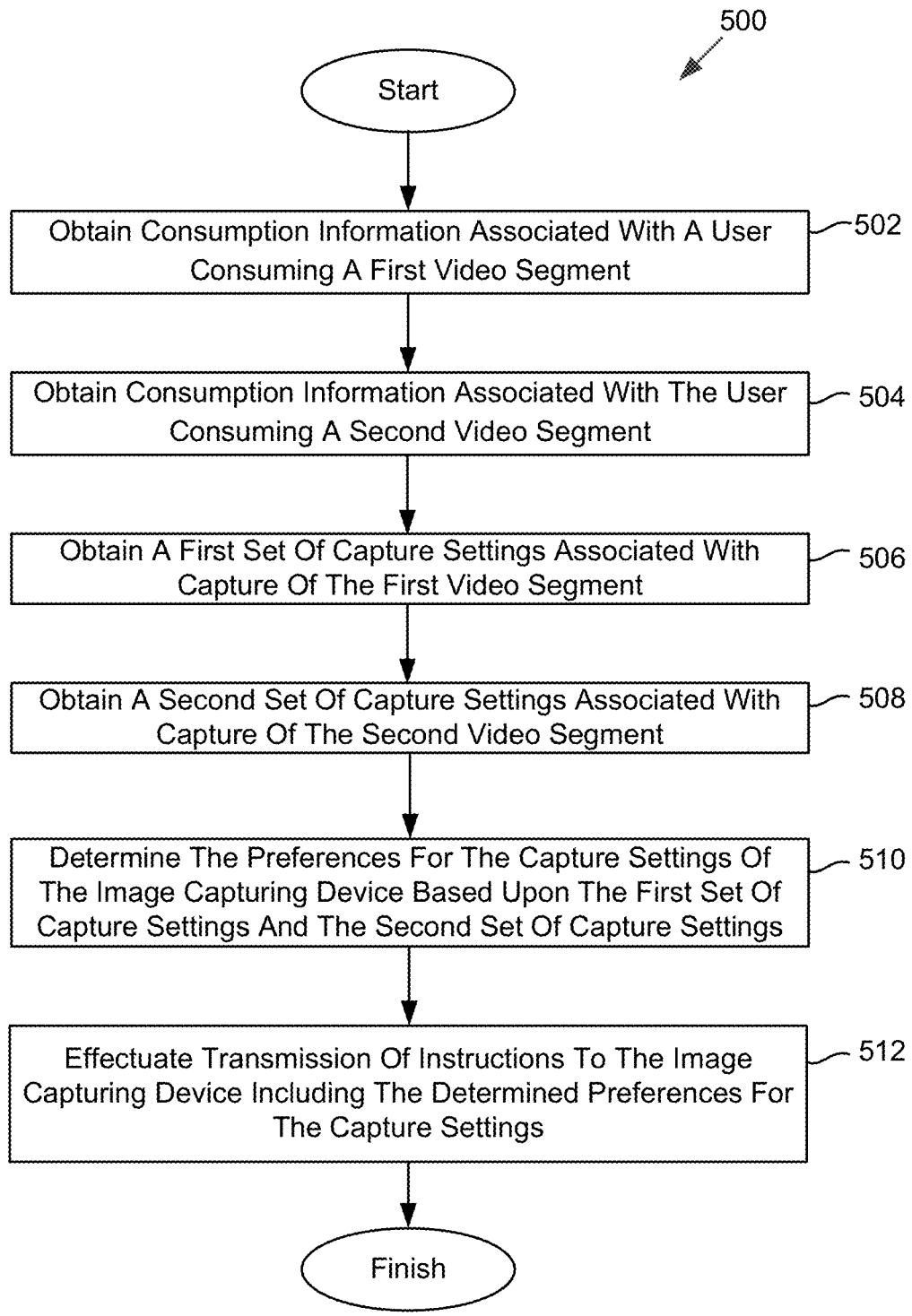
FIG. 5 illustrates a method for determining preferences for capture settings of an image capturing device, in accordance with one or more implementations.

FIG. 5 illustrates a method 500 for determining preferences for capture settings of an image capturing device, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, consumption information associated with a user consuming a first video segment may be obtained. At an operation 504, consumption information associated with the user consuming a second video segment may be obtained. Operations 502 and 504 may be performed by a consumption component that is the same as or similar to consumption component 108, in accordance with one or more implementations.

At an operation 506, a first set of capture settings associated with capture of the first video segment may be obtained. At an operation 508, a second set of capture settings associated with capture of the second video segment may be obtained. Operations 506 and 508 may be performed by a capture settings component that is the same as or similar to capture settings component 110, in accordance with one or more implementations.

At an operation 510, preferences for the capture settings of the image capturing device may be determined based upon the first set of capture settings and the second set of capture settings. Operation 510 may be performed by a preferences component that is the same as or similar to preferences component 512, in accordance with one or more implementations.

At an operation 512, instructions including the determined preferences may be transmitted to the image capturing device. Operation 512 may be performed by a transmission component that is the same as or similar to transmission component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine preferences for capture settings of an image capturing device, the system comprising:

one or more physical computer processors configured by computer readable instructions to:
 obtain consumption information associated with a user consuming a first video segment, the consumption information defining user engagement during a video segment and/or user response to the video segment;
 obtain consumption information associated with the user consuming a second video segment;
 obtain a first set of capture settings associated with capture of the first video segment;
 obtain a second set of capture settings associated with capture of the second video segment;
 determine the preferences for the capture settings of the image capturing device based upon the first set of capture settings and the second set of capture settings, the preferences for the capture settings being associated with the user, wherein the capture settings define aspects of operation for one or more of a processor of the image capturing device, an imaging sensor of the image capturing device, or an optical element of the first image capturing device, wherein the preferences for the capture settings are commonalities between the first set of capture settings and the second set of capture settings; and
 effectuate transmission of instructions to the image capturing device, the instructions including the determined preferences for the capture settings and being configured to cause the image capturing device to automatically adjust the capture settings to the determined preferences.

2. The system of claim 1, wherein the consumption information is associated with a consumption score, the consumption score quantifying a degree of interest of the user consuming the video segment based upon the user engagement during the video segment and/or the user response to the video segment.

3. The system of claim 1, wherein the user engagement during the video segment includes at least one of an amount of time the user consumes the video segment or a number of times the user consumes at least one portion of the video segment.

4. The system of claim 1, wherein the user response to the video segment includes one or more of commenting on the video segment, rating the video segment, or sharing the video segment.

5. The system of claim 1, wherein the image capturing device is configured to adjust the capture settings to the determined preferences based upon current contextual information that defines one or more current temporal attributes and/or current spatial attributes associated with the image capturing device and current capture settings of the image capturing device.

6. The system of claim 5, wherein the one or more current temporal attributes and/or current spatial attributes include one or more of a geolocation attribute, a time attribute, a date attribute, or a content attribute.

7. The system of claim 6, wherein the geolocation attribute includes a location of the image capturing device capturing a current video segment.

8. The system of claim 7, wherein the time attribute includes a timestamp associated with when the current video segment was captured.

9. The system of claim 7, wherein the date attribute includes one or more of a date associated with when the current video segment was captured, seasonal information associated with when the current video segment was captured, or a time of year associated with when the current video segment was captured.

10. The system of claim 6, wherein the content attribute includes one or more of an action depicted within the current video segment, one or more objects depicted within the current video segment, or a landscape depicted within the current video segment.

11. A method to determine preferences for capture settings of an image capturing device, the method comprising:
 obtaining consumption information associated with a user consuming a first video segment, the consumption information defining user engagement during a video segment and/or user response to the video segment;
 obtaining consumption information associated with the user consuming a second video segment;
 obtaining a first set of capture settings associated with capture of the first video segment;
 obtaining a second set of capture settings associated with capture of the second video segment;

determining the preferences for the capture settings of the image capturing device based upon the first set of capture settings and the second set of capture settings, the preferences for the capture settings being associated with the user, wherein the capture settings define aspects of operation for one or more of a processor of the image capturing device, an imaging sensor of the image capturing device, or an optical element of the first image capturing device, wherein the preferences for the capture settings are commonalities between the first set of capture settings and the second set of capture settings; and effectuating transmission of instructions to the image capturing device, the instructions including the determined preferences for the capture settings and being configured to cause the image capturing device to automatically adjust the capture settings to the determined preferences.

12. The method of claim 11, wherein the consumption information is associated with a consumption score, the consumption score quantifying a degree of interest of the user consuming the video segment based upon the user engagement during the video segment and/or the user response to the video segment.

13. The method of claim 11, wherein the user engagement during the video segment includes at least one of an amount of time the user consumes the video segment or a number of times the user consumes at least one portion of the video segment.

14. The method of claim 11, wherein the user response to the video segment includes one or more of commenting on the video segment, rating the video segment, or sharing the video segment.

15. The method of claim 11, wherein the image capturing device is configured to adjust the capture settings to the determined preferences based upon current contextual information that defines one or more current temporal attributes and/or current spatial attributes associated with the image capturing device and current capture settings of the image capturing device.

16. The method of claim 15, wherein the one or more current temporal attributes and/or current spatial attributes include one or more of a geolocation attribute, a time attribute, a date attribute, or a content attribute.

17. The method of claim 16, wherein the geolocation attribute includes a location of the image capturing device capturing a current video segment.

18. The method of claim 17, wherein the time attribute includes a timestamp associated with when the current video segment was captured.

19. The method of claim 17, wherein the date attribute includes one or more of a date associated with when the current video segment was captured, seasonal information associated with when the current video segment was captured, or a time of year associated with when the current video segment was captured.

20. The method of claim 16, wherein the content attribute includes one or more of an action depicted within the current video segment, one or more objects depicted within the current video segment, or a landscape depicted within the current video segment.

* * * * *